(12) United States Patent
Tamura

(10) Patent No.: US 8,348,306 B2
(45) Date of Patent: Jan. 8, 2013

(54) VEHICLE RESTRAINT SYSTEM

(75) Inventor: Atsutaka Tamura, Ann Arbor, MI (US)

(73) Assignee: Toyota Motor Engineering and Manufacturing North America, Inc., Erlanger, KY (US)

( * ) Notice: Subject to any disclaimer, the term of this patent is extended or adjusted under 35 U.S.C. 154(b) by 15 days.

(21) Appl. No.: 12/852,807

(22) Filed: Aug. 9, 2010

(65) Prior Publication Data
US 2012/0032428 A1 Feb. 9, 2012

(51) Int. Cl.
B60R 22/00 (2006.01)
B60R 22/48 (2006.01)
B60R 22/36 (2006.01)
B60R 22/46 (2006.01)
A62B 35/00 (2006.01)

(52) U.S. Cl. ............ 280/801.1; 280/806; 280/808; 180/268; 297/470; 297/471

(58) Field of Classification Search .............. 180/268; 280/801.1, 801.2, 806, 807, 808; 297/468, 297/480, 216.1, 216.15, 216.16, 216.18, 297/470, 471, 472
See application file for complete search history.

(56) References Cited

U.S. PATENT DOCUMENTS

| 4,705,296 | A | * | 11/1987 | Andersson et al. | 280/806 |
|---|---|---|---|---|---|
| 4,928,992 | A | * | 5/1990 | Qvint et al. | 280/801.1 |
| 5,207,618 | A | * | 5/1993 | Nishizawa | 474/101 |
| 5,552,986 | A | * | 9/1996 | Omura et al. | 701/45 |
| 5,855,047 | A | * | 1/1999 | Haas | 24/684 |
| 6,092,875 | A | * | 7/2000 | Pleyer | 297/470 |
| 6,164,700 | A | * | 12/2000 | Masuda et al. | 280/806 |
| 6,213,512 | B1 | * | 4/2001 | Swann et al. | 280/806 |
| 6,264,235 | B1 | | 7/2001 | Battermann et al. | |
| 6,419,272 | B1 | * | 7/2002 | Yamaguchi et al. | 280/806 |
| 6,497,456 | B1 | * | 12/2002 | Masuda et al. | 297/480 |
| 6,616,186 | B1 | * | 9/2003 | Midorikawa et al. | 280/801.1 |
| 6,666,292 | B2 | * | 12/2003 | Takagi et al. | 180/274 |
| 6,702,326 | B1 | * | 3/2004 | Fujii | 280/806 |
| 6,834,886 | B2 | | 12/2004 | Hasebe et al. | |
| 6,902,195 | B2 | * | 6/2005 | Ball et al. | 280/806 |
| 6,913,319 | B2 | * | 7/2005 | Yamaguchi et al. | 297/468 |
| 6,969,086 | B2 | | 11/2005 | Hasebe et al. | |
| 6,976,707 | B2 | * | 12/2005 | Modinger et al. | 280/806 |

(Continued)

OTHER PUBLICATIONS

Crandall, J. R., Limiting performance of seat belt systems for the prevention of thoracic injuries, Proc Inst Mech Engg Part D, J Automobile Engg, 214D (2000), pp. 127-139.

(Continued)

Primary Examiner — Paul N Dickson
Assistant Examiner — Joselynn Y Sliteris
(74) Attorney, Agent, or Firm — Christopher G. Darrow

(57) ABSTRACT

An automotive passenger restraint system of the lapbelt/diagonal shoulder belt type wherein a sensor and lookup table are used to detect the onset of a collision and provide a programmed (a) relocation of the inboard seatbelt anchor point to increase pelvic area restraint and (b) asymmetric airbag deployment.

11 Claims, 6 Drawing Sheets

U.S. PATENT DOCUMENTS

| | | |
|---|---|---|
| 7,001,338 B2 * | 2/2006 | Hayek et al. .................. 600/528 |
| 7,108,282 B2 | 9/2006 | Hasebe et al. |
| 7,114,590 B2 * | 10/2006 | McFalls et al. ............... 180/268 |
| 7,267,366 B2 | 9/2007 | Hasebe et al. |
| 7,359,781 B2 | 4/2008 | Foo et al. |
| 7,469,766 B2 * | 12/2008 | Guo et al. ..................... 180/268 |
| 7,516,987 B2 * | 4/2009 | Koide et al. .................. 280/806 |
| 7,584,997 B2 * | 9/2009 | Bachmann et al. ........ 280/801.1 |
| 7,967,339 B2 * | 6/2011 | Usoro et al. ............... 280/801.2 |
| 8,157,292 B2 * | 4/2012 | You et al. ..................... 280/804 |
| 2004/0163871 A1 | 8/2004 | Nobusawa |
| 2008/0036189 A1 | 2/2008 | Pausch |

OTHER PUBLICATIONS

Kent, R. W., Limiting performance analysis of a seat belt system with slack, Int J Impact Engg, 34 (2007), pp. 1382-1395.

Forman, J., Occupant restraint in the rear seat: ATD responses to standard and pre-tensioning, force-limiting belt restraints, In: Proceedings of the 52nd Annual Conference of Association for the Advancement of Automotive Medicine (2008).

\* cited by examiner

VEHICLE RESTRAINT SYSTEM

FIELD OF THE INVENTION

This invention relates to vehicular restraint systems and more particularly to a system for adjusting one or more parameters of a lap and shoulder belt restraint system with airbag in response to the onset of a vehicle collision.

BACKGROUND OF THE INVENTION

Modern automotive vehicles having at least one passenger seat are typically equipped with belt-type restraint systems having a high mounted outboard anchor point and a hip height inboard anchor point and a system comprising a diagonal shoulder belt and a lap belt, each of which extends to and/or through the inboard anchor point. In the typical system, the inboard anchor point is fixed regardless of the size and/or weight and/or age of the passenger being restrained. In this description, the term "anchor point" refers to a location where the belt system is grounded to the vehicle whether in a fixed fashion or by sliding.

It is known to deploy asymmetric airbag systems toward passengers in vehicle collisions to compensate for the asymmetric restraint provided by a single diagonal shoulder belt. For examples of asymmetric airbag systems, see U.S. Pat. No. 7,108,282 and the U.S. Patent Pub. No. 2008/0036189, both of which are assigned to Takata Corporation.

SUMMARY OF THE INVENTION

According to a first aspect of the invention, a restraint system of the type comprising a passenger seat and a belt system having at least one high-mounted outboard anchor point, and at least one hip height inboard anchor point and a belt system interconnecting the anchor points. The system further comprises a sensor for detecting the onset of a collision and triggering an actuator system for relocating the inboard anchor point to a tighter position thereby to prevent lateral translation of the pelvic area of the passenger in the course of a collision. The new position may be lower, closer to the passenger, or both.

In accordance with features of an illustrative embodiment of the invention, the restraint system is further equipped with an asymmetric airbag system designed to prevent twisting of a human body restrained by a single diagonal shoulder belt during a collision, the inflation of the asymmetric airbag being triggered by the signal from the collision onset sensor.

In accordance with a still further feature of an illustrative embodiment of the invention, means such as a computer with memory may be used to provide a lookup table containing information about the passenger in the seat equipped with the embodiment of the invention, thereby to regulate or modify the degree of seatbelt anchor point relocation according to a specification retrieval from or correlated to specific passenger identity. If desired, the inflation/deflation sequence of the asymmetric airbag system may also be varied, according to passenger specifics such as size, weight and age.

In accordance with a second aspect of the invention, a method of preventing or reducing injury to vehicular passengers is provided wherein the hip height anchor point of a two-part seatbelt type restraint system is relocated as a result of sensing the onset of a collision so as to tighten the belt restraint system around the pelvic area of the passenger and prevent lateral movement of the passenger's pelvic area relative to the seat during the collision. This method of preferably used in combination with an asymmetric airbag deployment and may be programmed according to passenger characteristics.

Both aspects of the invention will be best understood from a reading of the following written description of an illustrative and preferred embodiment of the invention which description is to be taken with the accompanying figures.

BRIEF SUMMARY OF THE DRAWINGS

The description herein makes reference to the accompanying drawings wherein like reference numerals refer to like parts throughout the several views and wherein.

DETAILED DESCRIPTION OF THE ILLUSTRATIVE EMBODIMENT

Figure 4:
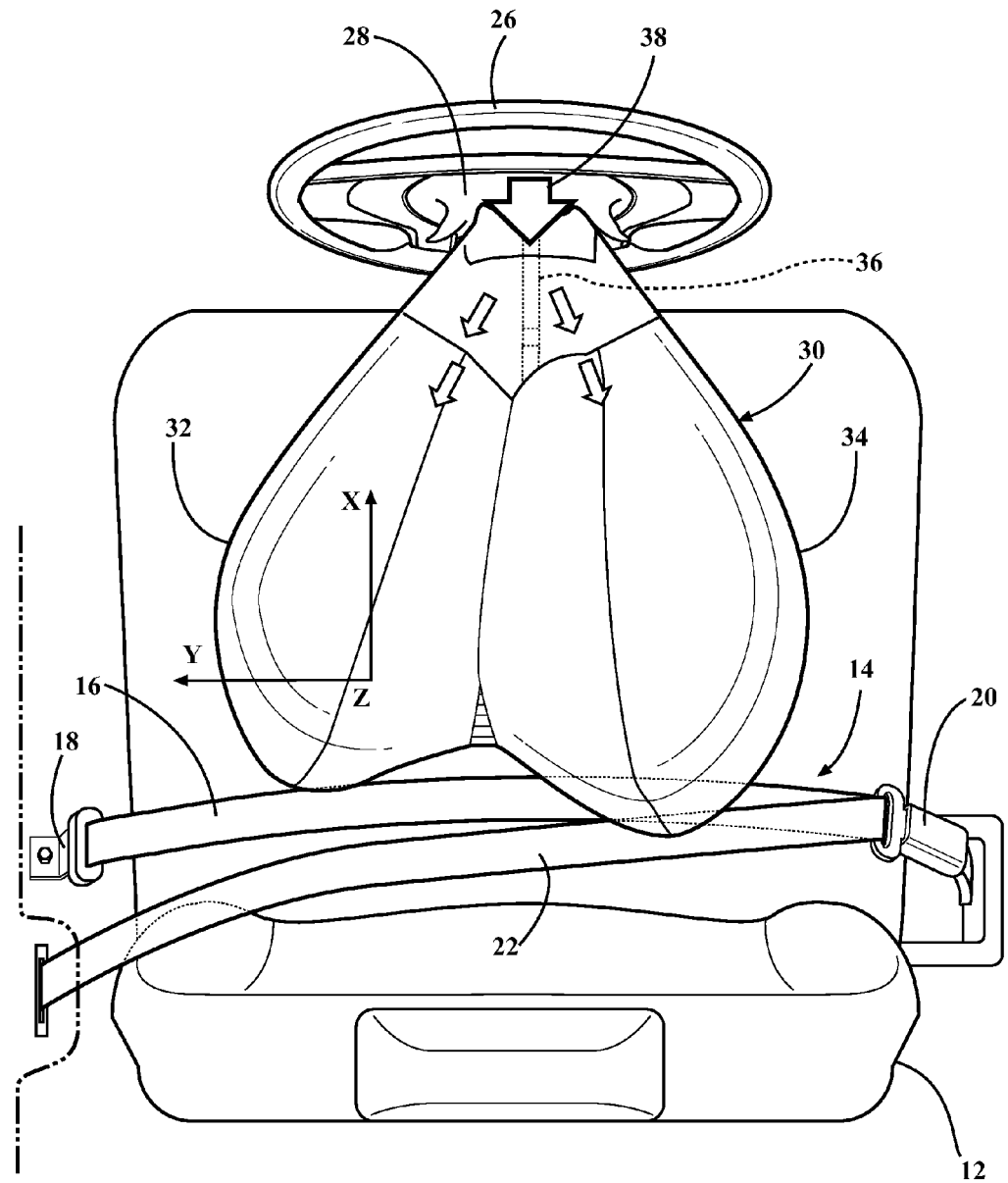
FIG. 4 is a plan view of a vehicular passenger seat equipped with an asymmetric airbag in accordance with the present invention.

Referring to the figures and especially to FIG. 4, an automotive vehicle 10 is equipped with at least one passenger seat 12 having a belt-type passenger restraint system 14 having a lap belt portion 16 which extends between an outboard anchor 18 and an inboard anchor 20 which is usually associated with a releasable latch 21 and slider loop. The belt system further comprises a diagonal shoulder belt portion 22 which extends from the inboard anchor point slider loop to a high mounted outboard anchor 24 having an inertial retractor/brake 25. This system is purely illustrative as seat belt systems vary from one car manufacturer to another. For example, some systems fix both shoulder and lap belts to the inboard anchor 20 while others use a slip loop between two belt portions at this same point.

The vehicle 10 is further equipped with a steering wheel 26 which is located immediately in front of the seat 12. The steering wheel 26 has a fixed; i.e., non-rotatable center portion 28 which houses an inflatable airbag 30 having asymmetric lobes 32, 34 of which the larger, stiffer and more prominent lobe 34 is on the passenger's inboard or, in this case, right side where the diagonal shoulder belt portion 22 is lowest on the body. The lobes are inflated by a gas 38 through a diffuser 36 which is configured to provide the asymmetric inflation. A steering wheel which maintains airbag orientation regardless of steering angle is shown in U.S. Pat. No. 6,264,234 to Petriag, the content of which is incorporated herein by reference.

Figure 5:
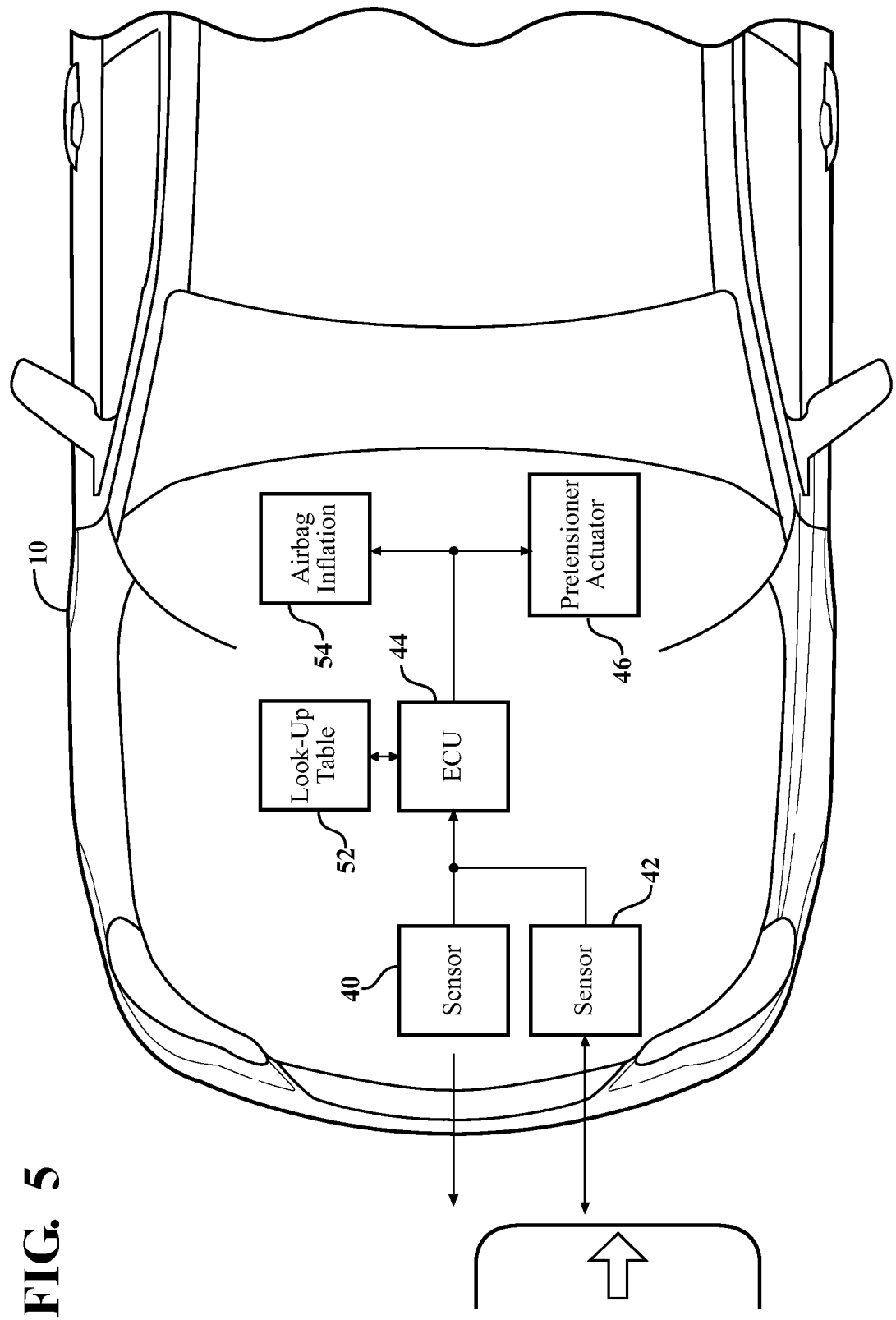
FIG. 5 is a plan view of an automobile showing system components in block diagram.

As shown in FIG. 5, the vehicle 10 is equipped with a first sensor 40 which may be an accelerometer to detect the onset of a collision and generate an electrical signal responsive thereto. The vehicle 10 may be further or alternatively equipped with a sensor 42 such as a sonar or radar-type device to look beyond the vehicle to detect the proximity and closing speed of an oncoming vehicle on a collision course with the vehicle 10.

Both of these sensors 40, 42 are connected as inputs to the ECU 44 which may take the form of a mini-computer or an integrated circuit board computer. The ECU 44 is equipped with a memory unit 52 containing a lookup table which is programmed to provide information regarding the physical characteristics of as many persons as are expected to drive the vehicle 10. These physical characteristics may include age, weight, height, hip width, and gender, any or all of which may be taken into account when providing program parameters as hereinafter described.

The output of the ECU 44 is connected to a seatbelt pretensioner actuator 46 as well as to an airbag inflation/deflation controller 54.

Figure 1:
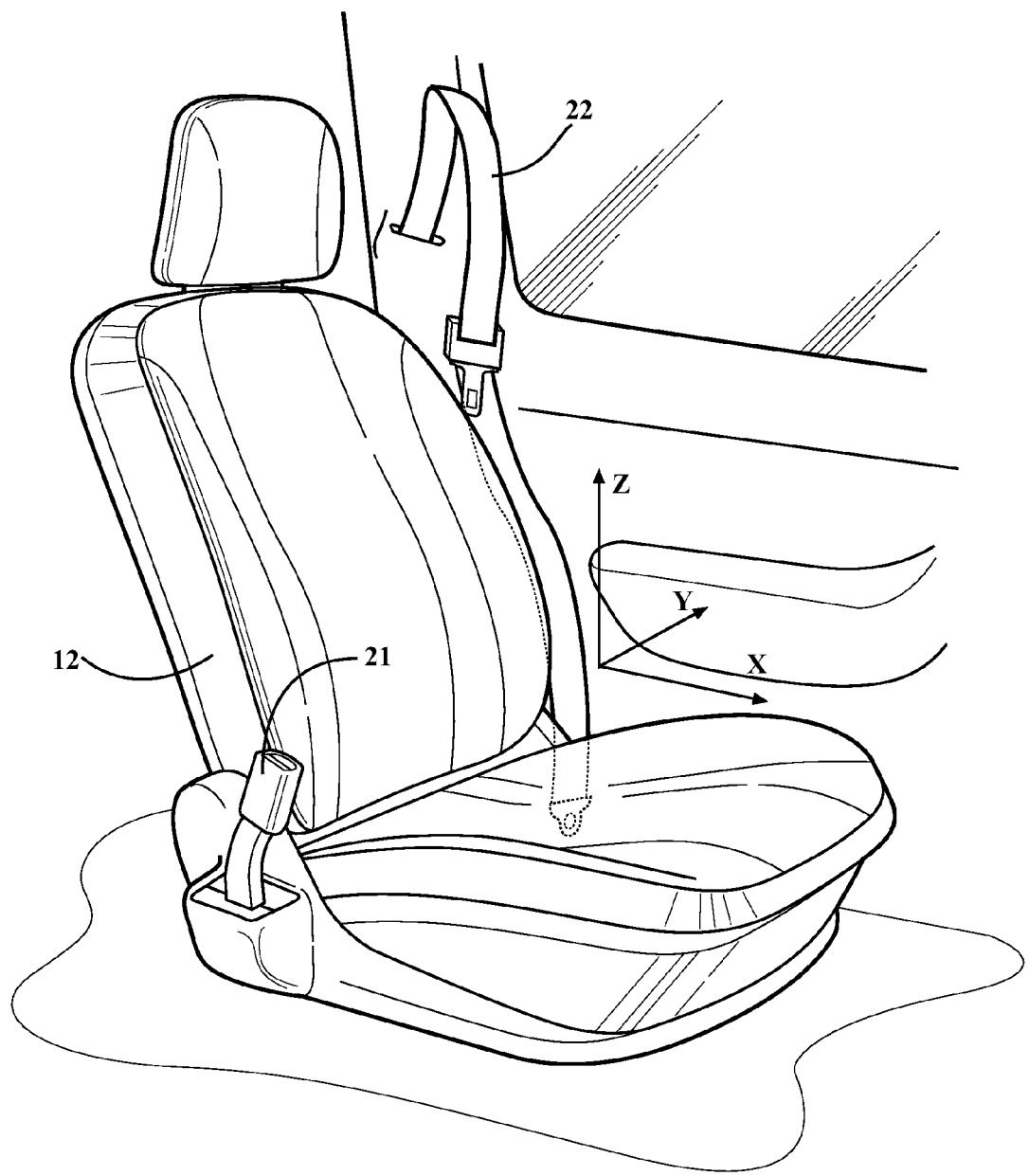
FIG. 1 is a perspective view of a vehicle seat which can embody the present invention.
Figure 2:
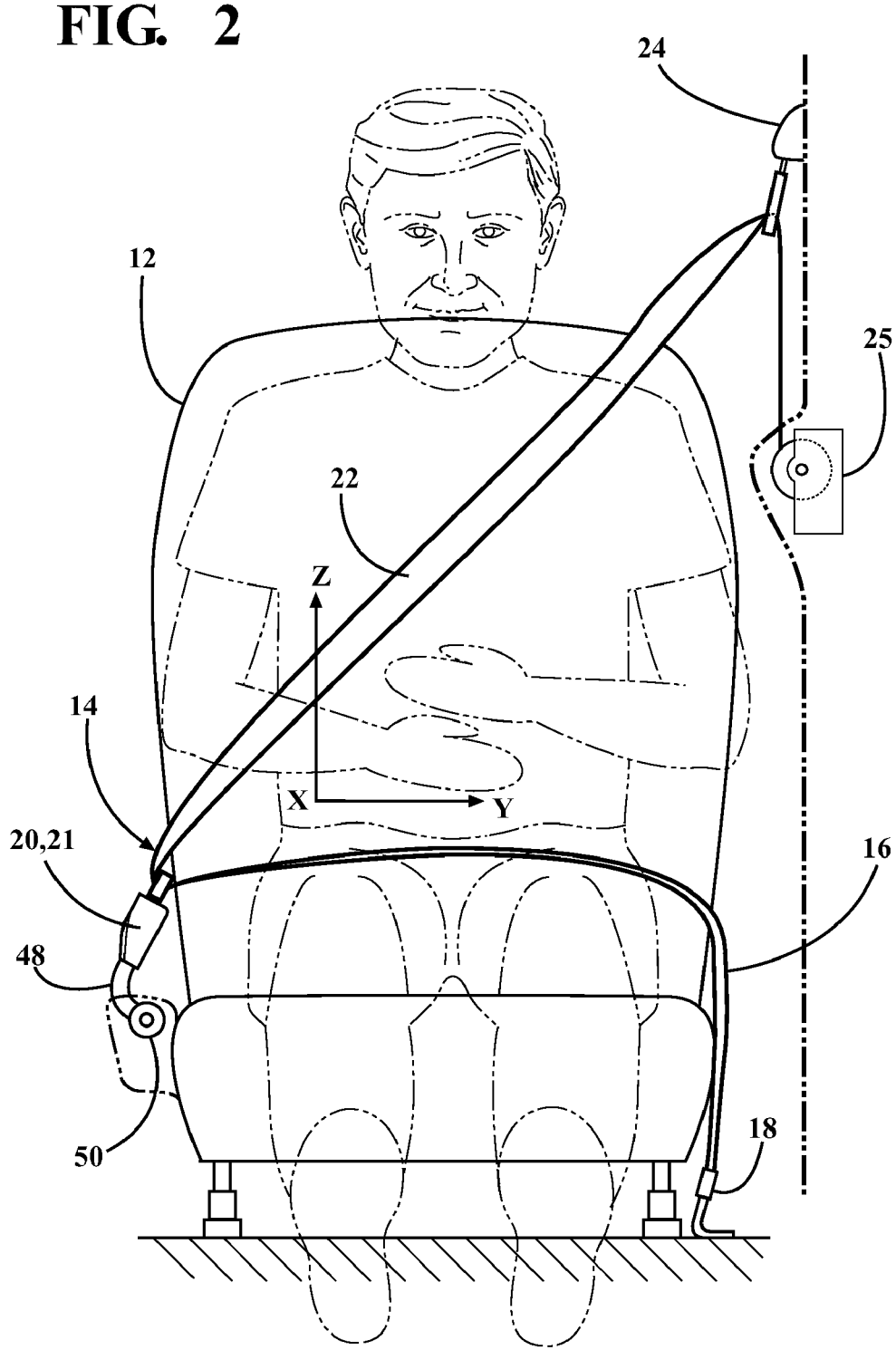
FIG. 2 is a front view of a seat with restraint system according to one aspect of the invention and having a male occupant.
Figure 3:
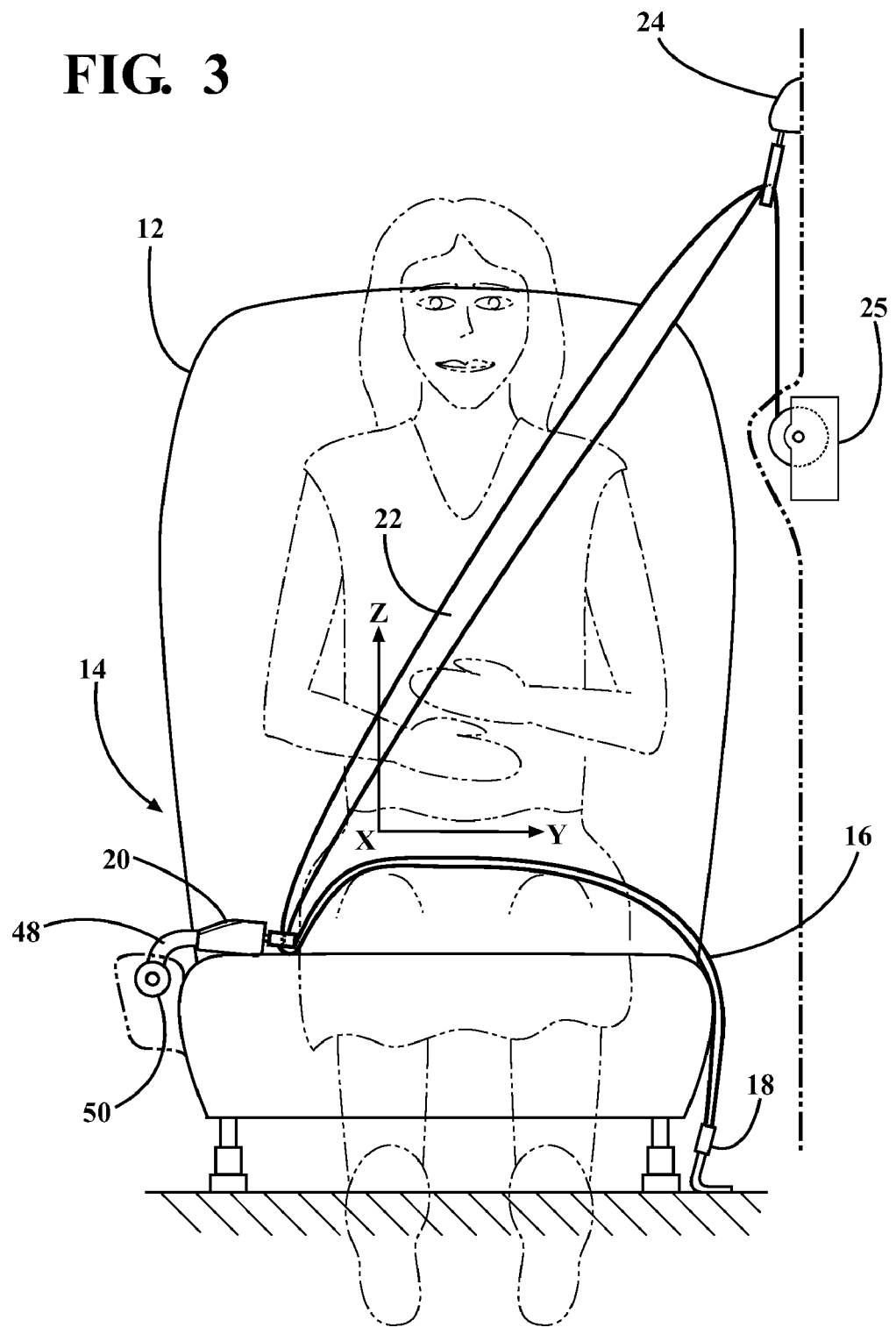
FIG. 3 is a front view of a seatbelt restraint system with a female occupant after the onset of a collision has been detected.

As illustrated in FIGS. 2 and 3, the actuator 46 comprises a motor connected to a rotor 50 which in turn is connected to a lever arm 48 on the end of which is mounted the inboard seatbelt anchor 20. When the motor 46 is actuated by the ECU 44, it causes rotation of the rotor 50 to reposition the anchor 20 to a lower position closer to the passenger's hip, as best shown in FIG. 3. Optimal movement parameters for the Z-axis or downward motion as well as the Y-axis or outboard motion (inward toward the driver's hip) are approximately 60 mm. However, the lookup table in memory 52 may be used to program this quantity to greater and/or lesser amounts of relocation according to the physical characteristics of the driver. For example, a smaller female may require a greater degree of pretensioning movement, thus to provide a higher level of lateral hip restraint in the course of a collision than would be necessary to restrain a larger, heavier male. The female relocation is shown in FIG. 3. The motor 46 and rotor 50 are but one illustrative mechanism for accomplishing the relocation motion of the inboard anchor 20 as will be apparent to those skilled in the mechanical arts. For example, if the Y- and Z-axis adjustments are to be made independently, two actuators will be used. The actuator must, however, be capable of achieving the relocation of the anchor 20 in approximately 50 ms.

Figure 6:
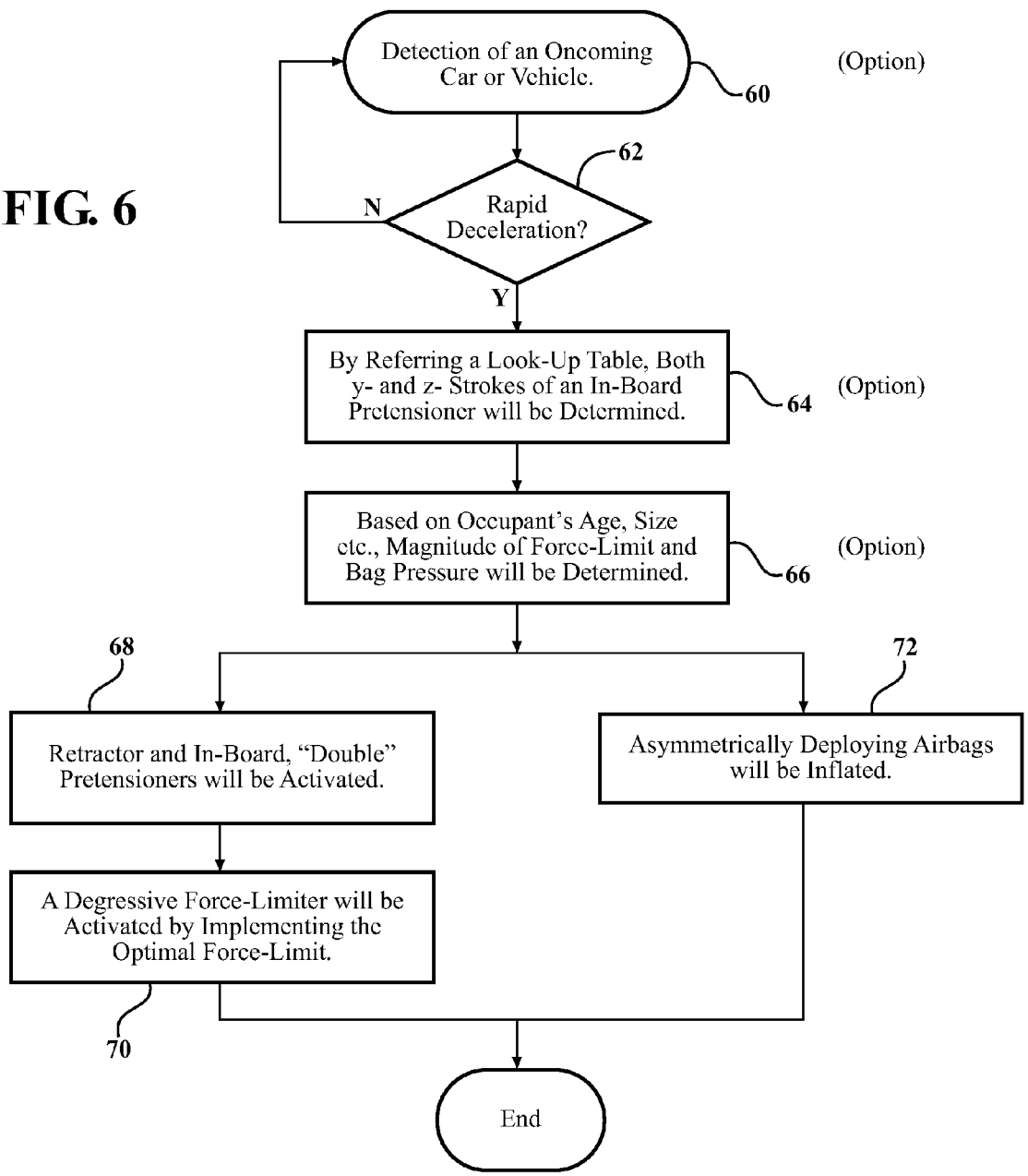
FIG. 6 is a flow chart of system operation.

Looking to FIG. 6, the method of operating the system described in FIGS. 1, 2, 3 and 4 will be described. The sensor 42 may be used to detect an oncoming, collision-course vehicle as shown in block 60. If the vehicle is detected, the system progresses to block 62 to determine whether the onset of a collision has occurred, this condition being represented by a rapid deceleration of the vehicle. If no rapid deceleration has occurred in block 62, the system cycles back to block 60 and repeats as long as necessary. If a rapid deceleration has occurred, the system progresses to block 64 wherein the ECU consults the lookup table 52 to determine the Y- and Z-stroke amounts to be employed by the actuator 46. Where these amounts are separately calculated and adjusted, the actuator 46 must have two motor-type components, one to control the Z or vertical axis movement and the other to control the Y or lateral axis movement. If the Y and Z movements are always correlated, a single actuator is sufficient. Driver's ID can be input via a key, a seat-position memory selector, a touch screen, or a stand-alone pushbutton set.

As shown in block 66, the lookup table may also be used to program the inflation of the airbag 30. The program from block 66 is used in both block 68 and 72 to control the actuator as well as the airbag deployment. Block 70 is a "digressive force limiter" step used to reduce the restraint force as desired during the ongoing or later milliseconds of the collision event.

Other applications of the present invention will become apparent to those skilled in the art when the following description of the best mode contemplated for practicing the invention is read in conjunction with the accompanying drawings.

What is claimed is:

1. An automotive passenger restraint system composed of a passenger seat having a seat base, wherein said seat base has an upper surface, an inward side edge, an outward side edge, and a middle of said upper surface between said inward side edge and said outward side edge as defined along a longitudinal axis of an associated vehicle, a high-mounted outboard anchor point and a hip area inboard anchor point and a belt interconnecting said anchor points wherein the improvement comprises:
    a sensor for detecting the onset of a collision and generating a signal related thereto; and
    an actuator system responsive to the generation of said signal for translating the inboard anchor point from a first position to a second position, wherein the second position is both lower and inwardly closer to said middle of said upper surface of said seat base, wherein the second position overlies said upper surface of said seat base.

2. The system of claim 1 wherein the actuator system comprises:
    a rotor operatively connected to a motor;
    a lever arm having a curved central region and opposed first and second ends, wherein the inboard anchor point is connected to the lever arm at the first end and the rotor is connected to the lever arm at the second end, the lever arm rotating inwardly from a first position to a second position overlying said upper surface of said seat base.

3. The system of claim 1 wherein the translation is in the order of 60 mm.

4. The restraint system described in claim 1 further comprising an inflatable airbag system positioned to restrain a passenger in the event of a collision; said airbag system being responsive to the generation of said signal to inflate.

5. The restraint system defined in claim 4 wherein the airbag system comprises asymmetric portions.

6. The system defined in claim 1 wherein the sensor includes an accelerometer.

7. The system described in claim 1 wherein the belt interconnecting said anchor points comprises lap and shoulder portions, both of which extend to and/or through the inboard anchor point.

8. The restraint system defined in claim 1 including an electronic control unit configured to regulate the degree of movement of the inboard anchor point.

9. The restraint system defined in claim 8 wherein said electronic control unit comprises a computer having a lookup table containing information about a passenger being restrained.

10. The restraint system of claim 2 wherein the lever arm has at least one curved region and is oriented such that the lever arm curves toward the associated passenger seat.

11. The restraint system of claim 9 wherein the degree of movement of the inboard anchor point is controlled by information of the passenger being restrained, the information including at least one of age, height, weight, hip width and gender.

* * * * *